United States Patent [19]

Tedder, Jr. et al.

[11] Patent Number: 4,663,138
[45] Date of Patent: May 5, 1987

[54] TRIMER PROCESS

[75] Inventors: Joseph B. Tedder, Jr.; J. Robert Adams, Jr., both of Baton Rouge, La.

[73] Assignee: Ethyl Corporation, Richmond, Va.

[21] Appl. No.: 854,016

[22] Filed: Apr. 21, 1986

[51] Int. Cl.$^4$ ............................................ C01B 25/10
[52] U.S. Cl. .................................................. 423/300
[58] Field of Search ........................................ 423/300

[56] References Cited

U.S. PATENT DOCUMENTS

| | | | |
|---|---|---|---|
| 3,694,171 | 9/1972 | Dreifus | 423/300 |
| 3,952,086 | 4/1976 | Fieldhouse | 423/300 |
| 4,175,113 | 11/1979 | Fieldhouse | 423/300 |
| 4,567,028 | 1/1986 | Tanino et al. | 423/300 |

OTHER PUBLICATIONS

Allcock et al., U.S. patent application Ser. No. 756,799 filed Jul. 19, 1985.

*Primary Examiner*—John Doll
*Assistant Examiner*—Wayne A. Langel
*Attorney, Agent, or Firm*—Donald L. Johnson; John F. Sieberth; J. D. Odenweller

[57] ABSTRACT

Polymer-grade cyclic phosphonitrilic halide trimer can be obtained by (i) reacting ammonium halide with phosphorus pentahalide in an inert solvent containing pyridine, substituted pyridines or mixtures thereof or hydrogen halide complexes thereof, (ii) washing the solvent phase with an aqueous alkali metal hydroxide and (iii) crystallizing cyclic trimer and/or distilling the cyclic trimer to obtain polymer-grade trimer.

27 Claims, No Drawings

TRIMER PROCESS

BACKGROUND OF THE INVENTION

Cyclic phosphonitrilic chloride trimer (hereinafter "trimer") can be used to make high molecular weight substantially linear polyphosphonitrilic chloride by heating the trimer at about 200°–300° C. for 12–24 hours. Unless the trimer is free of certain impurities, the polymerization will lead to a brown-black polymer and will prematurely cross-link to form a useless high gel polymer which will not dissolve in solvents such as tetrahydrofuran, cyclohexane or toluene and thus cannot be reacted with substituting agents to produce the more useful substituted polyphosphazenes.

Several methods are available for making polymer-grade trimer. One such method is described in Adams et al., U.S. Pat. No. 4,603,638. This involves distilling solvent from a solution of the crude trimer to form a hot concentrate and mixing the hot concentrate with water to crystallize trimer in a water-solvent mixture. The crystallized trimer is then distilled.

In Klobucar, application Ser. No. 658,307 filed Oct. 5, 1984, another procedure is described in which a trimer solution is distilled to remove a portion of the solvent leaving a hot concentrate which is cooled to crystallize trimer. The trimer is separated and distilled.

A very effective process for making polymer-grade trimer is described in Adams et al., U.S. Pat. No. 4,605,539. In this process the crude trimer is made in an inert solvent such as monochlorobenzene by reacting ammonium chloride with phosphorus pentachloride. The resultant crude solution is water washed. The washed solution is heated to distill out a portion of the solvent and then cooled to crystallize trimer which is then distilled to give polymer-grade trimer.

More recent research has found that the reaction of ammonium chloride with phosphorus pentachloride is promoted by including a nitrogenous base such as pyridine, Sulkowski et al., Chem. Stos. 26 (2) p. 245–252 (1982). In their research, pyridine was added to a ground mixture of phosphorus pentachloride and ammonium chloride causing a strong exothermic reaction rising rapidly to 180° C. with boiling. The process can be carried out in an inert solvent such as sym-tetrachloroethane.

Tanino et al., U.S. Pat. No. 4,567,028 describe a related procedure in which phosphorus pentachloride and ammonium chloride are reacted in an inert solvent in the presence of a catalytic amount of pyridine or an alkyl pyridine and a polyvalent metal compound.

Allcock et al., application Ser. No. 756,799 filed July 19, 1985 describe a method of controlling the strong exotherm reported by Sulkowski et al. Allcock et al. first react $PCl_5$ with pyridine to form a complex and then in a second stage react the complex with ammonium chloride to form trimer in high yield under controllable conditions.

Sulzer et al., application Ser. No. 798,910 filed Nov. 18, 1985 describe a very effective way to make trimer in which ammonium chloride and phosphorus pentachloride are reacted in a molten pyridine-HCl complex. The product extracts into a separate solvent phase from which it is recovered. The pyridine-HCl remains as a separate phase and can be recycled.

Although the more recent procedure involving the use of pyridine offers much faster reaction rates and high yields of trimer, they do seem to complicate the purification procedures. For example, trimer made by one of the pyridine routes is not consistently converted to polymer-grade trimer by any of the known purification procedures. Thus a need exists for a purification process that will consistently convert crude trimer made by a process involving the use of pyridine or a substituted pyridine to a polymer-grade trimer.

SUMMARY OF THE INVENTION

It has now been discovered that cyclic phosphonitrilic halide trimer made by the reaction of ammonium halide and phosphorus pentahalide in contact with pyridine or a substituted pyridine or a hydrogen halide complex thereof can be converted to polymer-grade trimer by washing the crude solution of the trimer with an aqueous alkali metal hydroxide and then crystallizing and/or distilling.

DESCRIPTION OF THE PREFERRED EMBODIMENTS

A preferred embodiment of the invention is a process for purifying a crude cyclic phosphonitrilic halide oligomer comprising mainly trimer which was made by a method which included contact of said phosphonitrilic halide oligomer with pyridine, a substituted pyridine or hydrogen halide complex thereof, said process comprising the steps of:
(A) washing a solution of said cyclic phosphonitrilic halide trimer in an inert solvent at least once with an aqueous alkali metal hydroxide solution; and
(B) distilling the cyclic phosphonitrilic halide trimer to recover polymer-grade cyclic phosphonitrilic halide trimer as the distillate.

Various procedures to make cyclic phosphonitrilic halide trimer that involved the use of pyridine or a substituted pyridine are available. One such procedure is described in Allcock et al., application Ser. No. 756,799. The Allcock et al. procedure comprises:
(A) reacting a phosphorus pentahalide with a nitrogenous base selected from pyridine, substituted pyridines and mixtures thereof to form a complex and
(B) reacting said complex with ammonia or ammonium halide at a temperature above about 90° C. to form a cyclophosphonitrilic halide.

Although any phosphorus pentahalide can be used including both phosphorus pentachloride and phosphorus pentabromide and mixtures thereof, the preferred phosphorus reactant is phosphorus pentachloride or the combination of phosphorus trichloride and chlorine which will produce phosphorus pentachloride. In the following description of the preferred embodiments, phosphorus pentachloride will be referred to but it is understood that phosphorus pentabromide can be substituted for all or part of the phosphorus pentachloride.

Any nitrogenous base which includes in its structure a pyridine ring can be used. Examples of these are pyridine, alphapicoline, β-picoline, gamma-picoline, quinoline, isoquinoline, 7-methylquinoline, 2,3-dimethylquinoline, lepidine, quinaldine, acridine, quinolinic acid, nicotinic acid, 2-aminopyridine, 2-phenylpyridine and the like including mixtures thereof. The most preferred nitrogenous base is the compound pyridine. The foregoing nitrogenous bases are referred to collectively as pyridine and substituted pyridines. In the following discussion pyridine will be used for exemplification but it is understood that any of the other nitrogenous bases may be substituted for pyridine but not necessarily with equal results.

The amount of pyridine is preferably at least 0.75 moles per mole of phosphorus pentachloride and still more preferably at least 0.9 moles per mole of phosphorus pentachloride. There is no real upper limit but increasing the amount of pyridine above about 3.0 moles per mole of phosphorus pentachloride does not appear to improve reaction rate or yield so a practical range is about 0.75–4.0 moles of pyridine per mole of phosphorus pentachloride and more preferably about 2–3 moles of pyridine per mole of phosphorus pentachloride.

The reaction of phosphorus pentachloride and pyridine is preferably conducted by slowly adding the pyridine to a slurry of finely divided phosphorus pentachloride in a suitable inert liquid reaction medium. Good results have been obtained using halogenated hydrocarbons as the reaction medium, especially chlorohydrocarbons such as chloroform, carbon tetrachloride, 1,1-dichloroethane, 1,2-dichloroethane and the like. More preferably the reaction medium should have a boiling point of at least 90° C. for reasons that will be apparent later. Most preferably the reaction medium will have a normal boiling point of about 90°–200° C. such as 1,1,2-trichloroethane, sym-tetrachlorotoluene, 1,1,1,2-tetrachloroethane, monochlorobenzene, 2-chlorotoluene, 3-chlorotoluene, 4-chlorotoluene, monochloroxylenes, ortho-dichlorobenzenes, meta-dichlorobenzenes, para-dichlorobenzenes and the like. Most research has been carried out using monochlorobenzene which is the preferred solvent. Most preferably the solvent will have a boiling point of about 110°–200° C. and most preferably 120°–150° C.

A preferred amount of solvent is about 50–1,000 parts by weight solvent for each 100 parts of PCl$_5$ and more preferably about 300–800 parts per 100 parts PCl$_5$.

The reaction between phosphorus pentachloride and pyridine will initiate at ambient temperature and may be conducted at temperatures up to reflux or higher under pressure as long as ammonium chloride is not present in the reaction mixture. Temperatures may be controlled by external cooling and by controlling the rate at which pyridine is added. Generally the reaction is started at ambient temperature (e.g. 20° C.) and allowed to rise to about 70° C. over the course of the pyridine addition. A phosphorus pentachloride-pyridine complex forms which is not completely soluble in monochlorobenzene and forms a slurry.

In the next stage the slurry of PCl$_5$-pyridine complex is reacted with an ammonium halide, preferably ammonium chloride which will be used in the following discussions for illustrative purposes although ammonium bromide may be substituted for all or part of the ammonium chloride. The ammonium chloride should be finely divided and can be made in that form by adding approximately equal mole amounts of ammonia and hydrogen chloride to an inert liquid reaction media, preferably one of those referred to earlier which has a normal boiling point of at least 90° C. The amount of such solvent is not critical but is preferably about 50–1,000 parts by weight and more preferably about 200–800 parts per each 100 parts of ammonium chloride. The amount of ammonium chloride formed should be at least 0.9 up to about 5 moles per mole of phosphorus pentachloride and more preferably at least 1.0 moles per mole of phosphorus pentachloride. Still more preferably a small excess of ammonium chloride is used such as about 1.05–1.5 moles and most preferably about 1.1–1.25 moles of ammonium chloride per mole of phosphorus pentachloride.

The second stage reaction is conducted by adding the slurry of PCl$_5$-pyridine complex to the slurry of ammonium chloride at a controlled rate at a reaction temperature of at least 90° C. up to about 200° C. or more depending upon the boiling point of the reaction medium. More preferably the reaction temperature is at least 110° C. up to reflux and most preferably about 120° C. up to reflux. Mixing of the phosphorus pentachloridepyridine complex and the ammonium chloride at temperatures substantially below 90° C. should be avoided because the complex does not react or reacts only sluggishly with ammonium chloride at temperatures below 90° C. and could lead to a build-up of unreacted reactants which could react violently when the temperature increases above about 90° C.

The time required for the second stage is a factor of both scale and capacity to remove the heat of reaction by external cooling and/or solvent reflux.

Following completion of the second stage the cyclic products are recovered and purified by the process of the present invention.

In another mode of conducting the process both the ammonium chloride and phosphorus pentachloride in a mole ratio of about 0.9–5:1.0, more preferably 1.05–1.5:1.0 and most preferably 1.1–1.25:1.0 are mixed in an inert liquid reaction medium having a boiling point above about 90° C. and most preferably in the range of 120°–150° C. and of the type previously described. Pyridine or one of the substituted pyridines is then added to the slurry at a controlled rate such that the temperature does not substantially exceed about 70° C. Functionally defined the temperature should be such that the pyridine or substituted pyridine will react with the phosphorus pentachloride in the presence of ammonium chloride to form a pyridine-phosphorus pentachloride complex but below the temperature at which this complex will react with ammonium chloride. Thus the reaction is still a two-stage process even though both PCl$_5$ and NH$_4$Cl are charged prior to feeding pyridine.

All reactant ratios are the same as in the previously described embodiment. After the pyridine has been charged and the pyridine-PCl$_5$ complex formed, the reaction mixture is heated to a temperature which will initiate the second stage reaction (approximately 90° C.). The second exothermic reaction will raise the temperature still further, generally up to the reflux temperature of the solvent which serves to assist in removing heat of reaction.

When the second stage reaction subsides, the mixture is preferably heated for a short period to make sure the reaction is complete and then cooled. Product is then recovered and purified by the process of the present invention.

The following examples will illustrate how the synthesis of trimer in the presence of pyridine can be conducted:

EXAMPLE 1

To a stirred reaction vessel was charged 1,894 grams of dry monochlorobenzene and 495 grams of reagent grade PCl$_5$. Then 499 grams of pyridine was slowly added, the first half over a 20 minute period and the last half in one addition. During addition of the first 200 grams of pyridine an exothermic reaction occurred with the maximum temperature reaching 57° C.

In a second stirred reaction vessel fitted with a reflux condenser was charged 852 grams of monochlorobenzene and 160 grams of finely divided dry NH$_4$Cl. The contents of the second flask were heated to monochlorobenzene reflux (127°–130° C.) and the contents of the first reaction vessel were added gradually over a 45 minute period. During this time the reaction mixture was at reflux due to the heat of reaction. Following this, 937 grams of monochlorobenzene was added to the first reaction vessel containing the PCl$_5$-pyridine complex to rinse residual solid into the second reaction vessel. External heat was then applied to maintain the reaction at reflux (126°–130° C.) for an additional hour. The reaction mixture was then allowed to cool to ambient temperature (20° C.) and 1,181 grams of water was added and the mixture stirred for 10 minutes following which the phases were allowed to separate. The organic phase (3,037 grams) was recovered. Analysis by $^{31}$P NMR indicated that the organic product contained 91.3 weight percent of the theoretical phosphorus charged to the reaction and that the product was 81.6 weight percent trimer, 4.1 weight percent tetramer and the balance higher phosphazenes.

EXAMPLE 2

In a stirred reaction vessel fitted with a reflux condenser was placed 495 grams PCl$_5$, 157 grams NH$_4$Cl and 1,295 grams of dry monochlorobenzene. The NH$_4$Cl was vacuum oven dried at 60° C. for 12 hours. Then 500 grams of pyridine was added slowly, the first half over a 20 minute period and the final half added all at once. During addition of the first half the temperature in the vessel rose from ambient (22° C.) to a maximum of 65° C. After about 200 grams of pyridine had been charged the exotherm reaction appeared to cease and the temperature began to fall. After completion of the pyridine feed external heat was applied to raise the temperature to 90° C. at which point a second exothermic reaction initiated and the external heat was removed. The exotherm of the reaction raised the temperature to reflux (132° C.) within 5 minutes after which the temperature began to fall. External heat was applied once again to maintain reflux for 1 hour. The reaction mixture was then allowed to cool to ambient temperature and 1,211 grams of water was added to dissolve pyridine hydrochloride and any excess ammonium chloride. The mixture was stirred for 10 minutes and then the phases permitted to separate. The organic phase was recovered. Analysis by 31P NMR showed that the organic product contained 98.6% of the phosphorus charged and that the product in the organic phase was 84.2% cyclic phosphonitrilic chloride trimer and 4.3% cyclic tetramer.

Another very useful way to make trimer is described in Sulzer et al., application Ser. No. 798,910. The Sulzer et al. process uses pyridine-hydrogen halide as a reaction media for the process. Several variations to accomplish this are described. One variation comprises:

(a) mixing about 1–20 moles of a hydrogen halide complex of a nitrogen base selected from pyridine, substituted pyridines and mixtures thereof with 1 mole of NH$_3$ to form a solution or slurry of ammonium halide in said nitrogen base and/or hydrogen halide complex thereof, said solution or slurry having an ammonium halide:nitrogen base or hydrogen halide complex thereof mole ratio of about 1:1–20;

(b) adding phosphorus pentahalide and a solvent for cyclic phosphonitrilic halide to said solution or slurry in an amount which provides 0.5–5 moles of phosphorus pentahalide for each mole of ammonium halide, (c) reacting the resultant mixture at a temperature above about 90° C. up to reflux to form said phosphonitrilic halide and hydrogen halide complex of said nitrogen base, and (d) separating a solution of said cyclic phosphonitrilic halide in said solvent from a second phase comprising said hydrogen halide complex of said nitrogen base.

The initial hydrogen halide complex of the nitrogen base could be made by merely adding hydrogen halide to the nitrogen base but this is not a preferred method. In a highly preferred method which will be described later the hydrogen halide complex is the recycled residue from a previous procedure. If one chooses to separately make the hydrogen halide complex, any hydrogen halide can be used that will form a nitrogen base complex that is molten at reaction temperatures including HCl, HBr, HF and HI or mixtures thereof but the preferred hydrogen halide is HCl. In the following discussion HCl will be used to represent the hydrogen halide with the understanding that any of the other hydrogen halides could be substituted for HCl. The amount of HCl added is preferably in the range of about 0.1–2.0 mole parts per mole part of pyridine. More preferably the amount is about 0.2–1.0 mole parts HCl per mole part of pyridine. This would require about 1–5 mole parts of pyridine to adsorb 1 mole part of HCl forming 1 mole part of pyridine-hydrogen chloride complex. Under these conditions with excess pyridine it is believed that the mono-HCl complex forms but whether the mono- or di-HCl complex forms is not critical to the success of the process.

The reaction of HCl with pyridine is exothermic. Temperature is not critical so it can be carried out over a wide temperature range. Preferably it is conducted at a temperature high enough to maintain a liquid phase. Pure pyridine-hydrogen chloride complex has a melting point of 82° C.

In a preferred mode, NH$_3$ is then added to convert at least part of the pyridine-HCl complex to NH$_4$Cl in situ. In the following discussion NH$_4$Cl can be any NH$_4$X salt. The amount of NH$_3$ can range from about 0.01–1.0 mole parts per mole part of HCl in the complex. More NH$_3$ can be added but this will not have any affect on the reaction. A more preferred range is about 0.25–1.0 moles of NH$_3$ for each 1–5 mole parts of pyridine-HCl complex.

The temperature of the reaction mixture during addition of the NH$_3$ should be high enough to maintain the pyridine-HCl complex in the liquid phase. Although pyridine-HCl has a melting point of 82° C. the impure mixture needs to be higher than this temperature to remain molten.

Phosphorus pentahalide can be added to the reaction mixture before the NH$_3$, concurrently with the NH$_3$ or after the NH$_3$. It is generally more convenient to add the phosphorus pentahalide after adding the NH$_3$. Any phosphorus pentahalide can be used such as PCl$_5$, PBr$_5$, PBrCl$_4$, PBr$_2$Cl$_3$, and the like. The preferred phosphorus pentahalide is phosphorus pentachloride, PCl$_5$ which will be used in the following discussion with the understanding that any of the other phosphorus pentahalides can be substituted for the PCl$_5$.

In an alternate mode of operation, the PCl$_5$ can be added prior to the NH$_3$. Since there isn't any NH$_4$Cl present at this stage, this can be conducted at higher temperatures, i.e. above 70° C. up to reflux. Then the NH$_3$ can be added all at once or over a period of time to form NH$_4$Cl which readily reacts with the PCl$_5$ above 90° C. up to reflux. Alternatively solid NH$_4$Cl could be added. The relative amount of reactants used in this mode of operation are the same as in the preferred mode.

Returning to the discussion of the preferred mode, the amount of PCl$_5$ added on a mole basis can be more or less than the amount of NH$_4$Cl formed by the addition of NH$_3$ to the pyridine-HCl complex. In order to maximize the amount of cyclics, the amount of PCl$_5$ should not greatly exceed the amount of NH$_4$Cl and preferably is equal or slightly less than the amount of NH$_4$Cl on a stoichiometric basis. The amount of NH$_4$Cl closely corresponds to the moles of NH$_3$ added to form the NH$_4$Cl. A preferred amount of PCl$_5$ is about 0.5–1.2 mole parts per mole part of NH$_4$Cl formed in the reaction mixture. More preferably the amount of PCl$_5$ is about 0.75–1.1 moles per mole of NH$_4$Cl in the reaction mixture and most preferably about 0.9–1.0.

The PCl$_5$ is preferably added as a solution or slurry in a solvent for the cyclic phosphonitrilic chloride trimer although the phosphorus pentachloride can be added in a dry or molten form and solvent can be added separately either prior to or after the addition of the PCl$_5$ or after the reaction is complete. Alternatively the pyridine-hydrogen chloride complex, before or after NH$_3$ addition, can be added to the solution or slurry of PCl$_5$ in the solvent for cyclic trimer. Instead of adding PCl$_5$, chlorine and PCl$_3$ can be added to form PCl$_5$ in situ.

In most of the discussion, the solvent is introduced into the reaction mixture along with the PCl$_5$. This is not a critical limitation since the solvent can be added at any time. For example, the entire reaction can be run without solvent and the solvent only used at the end to extract the polyphosphonitrilic halide from the pyridine-hydrogen halide heel. Alternatively, the solvent can be introduced at any stage or at multiple stages since its main function is to dissolve the product and extract it into a solvent phase.

The phosphorus pentachloride-solvent mixture can be added to the pyridine-hydrochloride complex and NH$_4$Cl all at once or it can be added over an extended period of time. On a large scale it is preferred to add the PCl$_5$-solvent mixture to the pyridine-hydrochloride complex and NH$_4$Cl also containing a solvent for cyclic phosphonitrilic chloride over an extended period of time, for example from 1–8 hours or more. Operating in this manner, the reaction forms cyclic phosphonitrilic chloride trimer rapidly and in high yield.

When making cyclic trimer, the overall idealized reaction disregarding any pyridine-HCl complex consumed and formed and other phosphazene species formed is represented by the following equation:

$$3PCl_5 + 3NH_4Cl \rightarrow (PNCl_2)_3 + 12 HCl$$

The HCl evolved in the reaction converts any pyridine or substituted pyridines present to their HCl complex. Shown in a sequential manner starting with the initial pyridine-HCl complex the reaction sequence can be depicted as follows:

I

1–20 moles Py-HCl + 1 mole NH$_3$ → 1 mole NH$_4$Cl + 1 mole Py + 0–19 moles Py-HCl

II

I + 0.5–1.2 mole PCl$_5$ → 0.5–1 (PNCl$_2$) units + 1–20 moles Py-HCl + 1–3 moles HCl + 0–0.5 moles NH$_4$Cl + 0–0.2 moles PCl$_5$ Thus the second reaction (II) regenerates the pyridine-HCl (Py-HCl) complex consumed by the initial reaction (I) by NH$_3$ in forming NH$_4$Cl. In fact the amount of HCl formed in the reaction of NH$_4$Cl with PCl$_5$ is so great that even if the initial reaction mixture contained only pyridine and ammonium chloride, the final reaction mixture would be phosphonitrilic chloride and pyridine-HCl complex unless the original reaction mixture contained over 4 moles of pyridine per mole of PCl$_5$.

Some of the reactions involved in the overall process are exothermic and require caution. For example, if Py-HCl is made by the reaction of pyridine and HCl the reaction is very exothermic and requires care. Likewise if PCl$_5$ is added to pyridine an exothermic reaction occurs in forming a pyridinePCl$_5$ complex. If PCl$_5$ is added to a mixture of Py-HCl, pyridine and NH$_4$Cl at a temperature over about 80° C. a reaction will ensue forming either cyclic or linear phosphonitrilic chloride depending upon reactant ratios. The reaction of PCl$_5$ with NH$_4$Cl to form phosphonitrilic chloride is in itself endothermic but the reaction evolves 4 moles of HCl for each (PNCl$_2$) unit formed and the HCl will react exothermically with pyridine to form Py-HCl until all the pyridine is consumed. However, if PCl$_5$ is added to a mixture of Py-HCl and NH$_4$Cl, the reaction is not exothermic since the reaction of PCl$_5$ with NH$_4$Cl is endothermic and there isn't any free pyridine to react with the HCl evolved.

In another embodiment, the NH$_3$ and PCl$_5$ are added to the pyridine-HCl complex concurrently in the desired mole ratio so that the pyridine-HCl complex functions as a reaction medium. Any pyridine-HCl complex converted to pyridine by reaction with NH$_3$ with pyridine-HCl is immediately converted back to pyridine-HCl by HCl generated in the overall reaction. For example both NH$_3$ and a solution of PCl$_5$ in a solvent (e.g. chlorinated aliphatic or aromatic hydrocarbon having a normal boiling point over 90° C.) in the mole ratio of 1 mole part NH$_3$ per each 0.5–1.2 mole parts of PCl$_5$ can be fed to molten pyridine-hydrochloride complex and reacted at a temperature of 90° C. up to reflux to form cyclic phosphonitrilic chloride trimer in a single step. The cyclic trimer will extract into the solvent phase and the second phase will be mainly pyridine-HCl complex which may contain some NH$_4$Cl. The amount of pyridine-HCl complex reaction medium should be about 1–20 mole parts, more preferably 2–4 mole parts, per each mole part of NH$_3$ or PCl$_5$ depending on which of these is present in the lower mole amount.

In another embodiment, PCl$_3$, chlorine and ammonia are all concurrently fed to a pyridine-hydrogen chloride complex at temperatures from melting up to 200° C. or higher to form phosphonitrilic chloride in one step. As in the other embodiments, the product is recovered by solvent extraction and the pyridine-HCl residue is recycled.

Following the reaction to form phosphonitrilic chloride and regenerate pyridine-HCl complex by any of the foregoing routes, the reaction mixture is allowed to separate into two phases, a solvent phase which contains the phosphonitrilic chloride and a pyridine-HCl complex phase. This separation should be conducted at a temperature high enough to maintain the pyridine-HCl complex in a molten form although on a small scale it can be cooled to solidify the pyridine-HCl liquid and the solvent phase containing the phosphonitrilic chloride merely poured from the solidified pyridine-HCl complex. The separation can be readily conducted by draining the molten pyridine-HCl from the bottom of the reaction vessel or by decanting or syphoning the solvent-phosphonitrilic chloride solution from the top of the reaction mixture.

In a most preferred embodiment the molten pyridine-HCl phase left as a "heel" following removal of the phosphonitrilic chloride-solvent phase, is recycled to the next process sequence. This eliminates the necessity of separately forming an initial pyridine-HCl complex. In fact the initial cycle of the present process would most preferably be conducted without forming pyridine-HCl by the separate step of adding HCl to pyridine but would be conducted by (i) adding PCl$_5$ to pyridine to form a pyridine-PCl$_5$ complex, (ii) mixing and reacting the pyridine-PCl$_5$ complex with a slurry of NH$_4$Cl in a solvent such as monochlorobenzene at a temperature above about 90° C. to form phosphonitrilic chloride and pyridine-HCl complex or by (a) adding a solution of PCl$_5$ in a solvent such as monochlorobenzene to a slurry or solution of NH$_4$Cl in pyridine at a temperature below about 80° C. to form a mixture comprising a pyridine-PCl$_5$ complex and NH$_4$Cl in a solvent and then (b) heating this mixture above 90° C. up to reflux to cause a reaction which forms cyclic and/or linear phosphonitrilic chloride and generates pyridine-HCl complex. After the initial cycle, the pyridine-HCl complex is formed by conducting a procedure as described above and separating the pyridine-HCl heel for recycle.

Still another method of making trimer involving the use of a pyridine compound comprises:

(a) mixing about 1–20 mole parts of a hydrogen halide complex of pyridine or a substituted pyridine with about 0.5–5 mole parts of phosphorus pentahalide and a solvent for said phosphonitrilic halide to form a resultant mixture, (b) adding about 1 mole part of ammonium halide to said resultant mixture and reacting at a temperature above about 90° C. to form said phosphonitrilic halide, (c) separating the solvent phase containing said phosphonitrilic halide from the pyridine-hydrogen halide phase, (d) recovering said phosphonitrilic halide from said solvent phase and (e) recycling said pyridine-hydrogen halide phase as at least part of said hydrogen halide complex of pyridine or substituted pyridine used in step (a) of a subsequent procedure carried out in substantially the same way.

EXAMPLE 3

An Initial Cycle

In a reaction vessel fitted with a stirrer, reflux condenser, thermometer and heating means was placed 1,033 grams monochlorobenzene, 495 grams PCl$_5$ and 121 grams NH$_4$Cl. Then 500 grams of pyridine was added in small increments of about 30–40 ml each. The addition schedule and temperature was as follows:

| Time (min.) | Pyridine Increment (ml) | Addition Temp. (°C.) |
|---|---|---|
| 0 | 0 | |
| 3 | 35 | 29 |
| 4 | 0 | |
| 5 | 35 | 41 |
| 6 | 40 | 42 |
| 7 | 30 | 43 |
| 8 | 45 | 47 |
| 9 | 50 | 51 |
| 10 | 15 | 52 |
| 11 | remainder | 54 |

The mixture was then heated to reflux (about 130° C.) over a 10 minute period and maintained at reflux for 60 minutes. Heating and stirring was stopped and two phases separated. The upper solvent phase was decanted from the lower "heel" phase. The solvent phase contained 89.5 weight percent of the phosphorus initially charged as PCl$_5$. This has now been converted to polyphosphonitrilic chloride which analyzed 77.4 weight percent cyclic trimer, 3.5 weight percent cyclic tetramer and the remainder higher cyclics and linear oligomers. Polymer-grade trimer is recovered from the solvent phase by the procedure of the present invention.

EXAMPLE 4

A Recycle Run Using NH$_4$Cl

To a reaction vessel containing the molten pyridine-HCl heel from Example 3 was charged 121 grams of NH$_4$Cl. A solution of 495 grams of PCl$_5$ in 1,049 grams of monochlorobenzene was prepared by stirring and heating the mixture above 100° C. This PCl$_5$ solution was fed to the molten pyridine-HCl heel in three increments as follows.

| Time (min.) | Temp. (°C.) | Remarks |
|---|---|---|
| 0 | 141 | feed 25 seconds |
| 1 | 128 | |
| 2 | 125 | |
| 20 | 128 | |
| 21 | 131 | feed 25 seconds |
| 22 | 129 | |
| 24 | 126 | |
| 47 | 130 | |
| 49 | 131 | feed remainder (30 sec) |
| 51 | 123 | |
| 56 | 120 | |
| 62 | 122 | |

The mixture was then heated to reflux and stirred at reflux for about 1 hour. Heating and stirring was stopped and the phases separated. On further cooling the lower pyridine-HCl phase solidified. The upper phase was removed and found to contain 99.5 weight percent of the phosphorus initially charged to the reaction. The polyphosphazenes in the monochlorobenzene phase were 80.8 weight percent cyclic trimer, 2.2 weight percent cyclic tetramer and the balance higher cyclics and linear oligomers. Polymer-grade trimer can be recovered by (1) aqueous caustic wash, (2) crystallizing cyclic trimer and then (3) distilling the crystallized trimer.

The foregoing examples are for the purpose of showing some of the many ways that trimer can be made in a process involving the use of pyridine or a substituted pyridine. They all have in common the final production of a solution of crude trimer in an inert solvent. The present invention is concerned with the processing of this solution to obtain a polymer-grade trimer meaning a trimer that can be polymerized by heating at about 225°–300° C. optionally in the presence of a catalyst to make a substantially linear, high molecular weight polyphosphonitrilic halide that is soluble in tetrahydrofuran and cyclohexane and very light colored.

Solvents used are generally aliphatic or aromatic halogen compounds such as carbon tetrachloride, 1,1,1-trichloroethane, sym-tetrachloroethane, monochlorobenzene, monochlorotoluene, dichlorobenzene and the like including bromine analogs. Preferred solvents are the halogenated aromatics, especially monochlorobenzene (hereinafter "MCB").

The concentration of the crude oligomer solution in the inert solvent usually is in the range of 20–30 weight percent. The solution can be filtered at this stage if it contains solids. The clear solution is then preferably washed at least once with water to remove water soluble impurities. This water wash is not essential and one can go directly to the caustic wash step. However better results have been achieved using at least one initial water wash.

The organic solution is then washed with aqueous alkali metal hydroxide useful hydroxides include both sodium and potassium hydroxides. Aqueous sodium hydroxide is preferred because of its lower cost. The sodium hydroxide concentration in the caustic wash can vary widely. A useful range is about 0.5 to 25 weight percent NaOH. A more preferred caustic concentration is about 1–5 weight percent.

The amount of caustic wash can vary widely. Good results can be achieved using about 10–100 parts by weight aqueous caustic wash per 100 parts of organic solution.

The wash can be conducted over a wide temperature range. A useful temperature range is from ambient up to 100° C. Good results have been achieved at about 50–80° C.

The wash period can extend from a few minutes to several hours. It would be expected that the aqueous caustic would attack the phosphorus bound chlorine so a long wash at high temperatures should be avoided. In fact it is quite surprising that the caustic wash does not destory the trimer in view of the reactivity of the phosphorus bound chlorine. It has been found that excellent results are achieved by washing the trimer solution at about 70° C. for a period of one hour.

Following the caustic wash the trimer solution is crystallized to recover crystalline trimer. In order to improve trimer recovery a portion of the solvent is generally distilled out to increase the concentration of the trimer in the solvent. The optimum concentration for crystallization will vary depending on what solvent is used. With MCB good results are achieved by increasing the concentration to about 50–85 weight percent phosphonitrilic halide oligomer. Crystallization is then induced by cooling the concentrated solution to room temperature or lower, e.g. −10° C. to 30° C.

The crystallized trimer is then separated from the mother liquor. It is then subjected to distillation to complete the purification. This can be a simple one-plate distillation and need not involve a multi-plate rectification. The distillation is preferably conducted at reduced pressure to avoid polymerization which occurs above 200° C. A useful pressure is about 10–50 Torr and preferably about 20–30 Torr.

A forecut of about 0.5–5 weight percent, more preferably about 1–3 weight percent of the crude trimer charge should be taken overhead first and segregated from the main cut. The main cut or heart-cut is taken next and is continued until the pot temperature reaches about 190° C. Overhead temperature at 25 Torr will be about 140–150° C.

The distilled trimer is ready for polymerization to a substantially linear high molecular weight polyphosphonitrilic halide. This can be accomplished by heating the polymer-grade trimer at about 200–300° C. preferably in the presence of a small amount of a catalyst such as aluminum chloride, iron chloride, boron chloride and the like.

A series of six runs, five of which involved recycle of reaction medium were carried out following the general procedure of Example 4. The following example shows the purification of the crude trimer resulting from the final run of this series of six runs.

EXAMPLE 5

The crude trimer-monochlorobenzene solution (1268 grams) from the last run of the above series of six runs was mixed with 667 grams of deionized water at 70° C. This mixture was stirred one hour at 70° C. and then the phases were separated and the water phase removed. The organic phase (now 1180 grams) was then mixed with 600 grams of water at 70° C. To this was added 32 grams of sodium hydroxide and 233 grams of 5 weight percent aqueous sodium hydroxide to give a pH of 10. The temperature rose to 84° C. The mixture was then stirred at 70° C. for 1 hour and then separated to give 1121 grams of organic phase. The organic phase was heated under vacuum to distill off a portion of the monochlorobenzene solvent. The solvent removal was continued until the solution weight dropped to 230 grams which was equivalent to a 68 weight percent trimer solution. This concentrate was cooled to 30° C. causing 43 grams of trimer to crystallize. The crystallized trimer was separated by filtration. The crystals were placed in a distillation vessel and pressure was lowered to 25 Torr. Heat was applied and an initial forecut of about 1 gram was removed. When distillation was continued and a heart-cut was removed at 144°–148° C. overhead temperature until the pot temperature reached about 200° C. The heart-cut was about 90% of the initial charge.

The trimer heart-cut was placed in a sealed polymerization vessel together with 0.036 grams of a boron trichloridetriphenylphosphate complex as a catalyst. This was heated to 220° C. and held at that temperature for 20 hours. The polymerization vessel was then cooled and linear high molecular weight polyphosphonitrilic chloride was recovered by (1) dissolving the crude polymer in cyclohexane, (2) adding heptane to precipitate linear high molecular weight polymer leaving cyclics in solution and (3) decanting to recover high molecular weight polyphosphonitrilic chloride gum. Conversion of trimer to polymer was 65.5% and the polymer had a LVN ("Limiting Viscosity Number") of 1.01. It was very light in color and was of acceptable commercial quality.

EXAMPLE 6

Trimer synthesis was conducted by feeding 1500 grams of pyridine to a slurry of 363 grams of ammonium chloride and 1485 grams of phosphorus pentachloride in 2869 mls of monochlorobenzene while cooling to keep the temperature below about 80° C. (approximately 70°-75° C.). When this was complete, cooling was removed and heat applied. At about 90° C. an exothermic reaction started raising the temperature to reflux (ca. 132° C.). At this point, NMR analysis showed that the reaction was complete but heat was applied to continue reflux for 1 hour. Stirring was stopped and the monochlorobenzene and pyridine-HCl phases separated. The upper solvent phase was decanted to give 3501 grams of a monochlorobenzene solution of crude trimer. Excluding solvent the crude phosphonitrilic chloride oligomer mixture contained 79.1 weight percent cyclic trimer.

Then 1740 grams of the monochlorobenzene solution was washed with 942 grams of deionized water at 70° C. for 1 hour. The water phase was then removed leaving 1,703 grams of a solvent phase.

Next 1,694 grams of the solvent phase was mixed with 932 grams of water and 18 grams sodium hydroxide and the mixture stirred for 1 hour. Temperature was about 48° C. at the start of the caustic treatment and the pH was 10. The solvent phase was then separated to give 1662 grams of solution estimated to contain about 279 grams of crude trimer. A portion of the monochlorobenzene was distilled out to increase the crude trimer concentration to about 68 weight percent. This left 419 grams of monochlorobenzene solution. The concentrated solution was cooled to room temperature and trimer crystallized and was recovered by filtration (176 grams dry weight).

The crystallized trimer was placed in a polymerization vessel together with 0.036 grams of boron trichloride-triphenylphosphate catalyst. This was heated to 220° C. and held at this temperature for 20 hours. The vessel was then cooled and high molecular weight substantially linear polyphosphonitrilic chloride recovered by the same procedure used in Example 5. Conversion to polymer was 82.2% and the polymer was very light in color with a LVN of 1.33.

We claim:

1. A process for purifying a crude cyclic phosphonitrilic halide oligomer comprising mainly trimer which was made by a method which included contact of said phosphonitrilic halide oligomer with pyridine, a substituted pyridine or hydrogen halide complex thereof, to obtain a polymer-grade phosphonitrilic halide trimer said process comprising the steps of:
   (A) washing a solution of said cyclic phosphonitrilic halide trimer in an inert solvent at least once at 50°-80° C. with an aqueous alkali metal hydroxide solution; and
   (B) distilling the cyclic phosphonitrilic halide trimer to recover polymer-grade cyclic phosphonitrilic halide trimer as the distillate.

2. A process of claim 1 which includes the additional steps following step (A) but before step (B) of:
   (A′) crystallizing cyclic phosphonitrilic halide trimer from said inert solvent,
   (A″) separating the crystallized trimer from said inert solvent.

3. A process of claim 1 wherein said phosphonitrilic halide is a phosphonitrilic chloride.

4. A process of claim 2 wherein said phosphonitrilic halide is a phosphonitrilic chloride.

5. A process of claim 1 wherein said inert solvent is an aliphatic or aromatic halide.

6. A process of claim 5 wherein said inert solvent is an aromatic chloride.

7. A process of claim 6 wherein said aromatic chloride is monochlorobenzene.

8. A process of claim 7 wherein said phosphonitrilic halide is phosphonitrilic chloride.

9. A process of claim 8 wherein said inert solvent is an aliphatic or aromatic halide.

10. A process of claim 9 wherein said inert solvent is monochlorobenzene.

11. A process of claim 10 wherein said alkali metal hydroxide is sodium hydroxide.

12. A process of claim 11 which includes the additional steps after step (A) but before step (B) of
   (A′) distilling to remove a portion of said monochlorobenzene sufficient to cause crystallization when the resulting solution is cooled;
   (A″) crystallizing cyclic phosphonitrilic chloride trimer from said monochlorobenzene;
   (A‴) separating the crystallized trimer from said monochlorobenzene.

13. A process of claim 11 wherein prior to step (A), said solution of cyclic phosphonitrilic chloride is washed at least once with water.

14. A process for making polymer-grade cyclic phosphonitrilic halide trimer, said process comprising
   (A) reacting ammonium halide with phosphorus pentahalide in an inert solvent containing pyridine, substituted pyridine or mixtures thereof to form a crude solution of mainly cyclic phosphonitrilic halide oligomers containing about 3-7 $(PNX_2)$ units wherein X is halogen,
   (B) washing said crude solution at least once at 50°-80° C. with aqueous alkali metal hydroxide and
   (C) distilling to recover polymer-grade cyclic phosphonitrilic halide trimer.

15. A process of claim 14 for making polymer-grade cyclic phosphonitrilic chloride trimer wherein said ammonium halide is ammonium chloride, and said phosphorus pentahalide is phosphorus pentachloride.

16. A process of claim 15 wherein said inert solvent is monochlorobenzene.

17. A process of claim 16 including after step (A) but before step (B) the step:
   (A′) washing said crude solution at least once with water.

18. A process of claim 17 including after step (B) but before step (C) the steps:
   (B′) distilling a portion of said monochlorobenzene from the alkali metal hydroxide washed crude solution to form a more concentrated solution,
   (B″) crystallizing cyclic phosphonitrilic chloride trimer from said more concentrated crude solution.

19. A process for making polymer-grade cyclic phosphonitrilic chloride trimer, said process comprising:
   (A) reacting phosphorus pentachloride with a nitrogenous base selected from pyridine, substituted pyridine and mixtures thereof in an inert liquid reaction medium to form a complex,
   (B) reacting said complex with ammonium chloride at a temperature above 90° C. to form a crude solution of cyclic phosphonitrilic chloride trimer,
   (C) washing said crude solution at least once at 50°-80° C. with aqueous alkali metal hydroxide,
   (D) crystallizing cyclic phosphonitrilic chloride trimer and
   (E) distilling the crystallized trimer to recover polymer-grade cyclic phosphonitrilic chloride trimer.

20. A process of claim 19 wherein said inert liquid reaction media is monochlorobenzene, said nitrogenous base is pyridine and said alkali metal hydroxide is sodium hydroxide.

21. A process of claim 20 including after step (B) but before step (C) the step:
(B') washing said crude solution at least once with water.

22. A process of claim 21 including after step (C) but before step (D) the step:
(C') distilling a portion of said monochlorobenzene from the aqueous sodium hydroxide washed crude solution to form a more concentrated crude solution.

23. A process for making polymer-grade cyclic phosphonitrilic halide trimer, said process comprising:
(A) reacting ammonium halide with phosphorus pentahalide in a hydrogen halide complex of a nitrogenous base selected from pyridine, substituted pyridines and mixtures thereof and an inert solvent for cyclic phosphonitrilic halides,
(B) separating the inert solvent phase containing crude cyclic phosphonitrilic halides from a residual hydrogen halide complex phase,
(C) washing said inert solvent phase at 50°–80° C. with an aqueous alkali metal hydroxide,
(D) crystallizing cyclic phosphonitrilic halide trimer from said inert solvent and
(E) distilling the crystallized cyclic phosphonitrilic halide trimer to recover polymer-grade cyclic phosphonitrilic halide trimer.

24. A process of claim 23 for making polymer-grade cyclic phosphonitrilic chloride trimer wherein said ammonium halide is ammonium chloride, said phosphorus pentahalide is phosphorus pentachloride and said nitrogenous base is pyridine.

25. A process of claim 24 wherein said inert solvent is monochlorobenzene and said alkali metal hydroxide is sodium hydroxide.

26. A process of claim 25 including after step (B) but before step (C) the step:
(B') washing said inert solvent phase with water.

27. A process of claim 26 including after step (C) but before step (D) the step:
(C') distilling a portion of said monochlorobenzene from said inert solvent phase to obtain a more concentrated solution of cyclic phosphonitrilic chloride trimer.

* * * * *